H. F. LOOMIS.
CARRIAGE FOR HEAVY FIELD ARTILLERY.
APPLICATION FILED SEPT. 12, 1916.
1,220,246.
Patented Mar. 27, 1917.
2 SHEETS—SHEET 1.
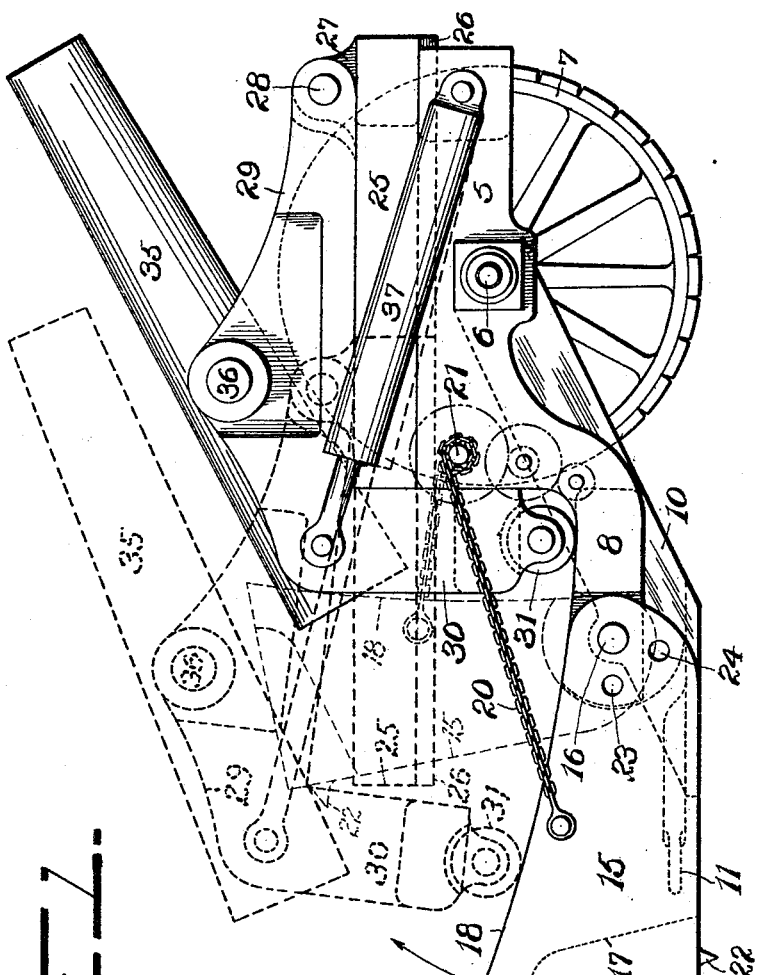
Henry F. Loomis,
Inventor

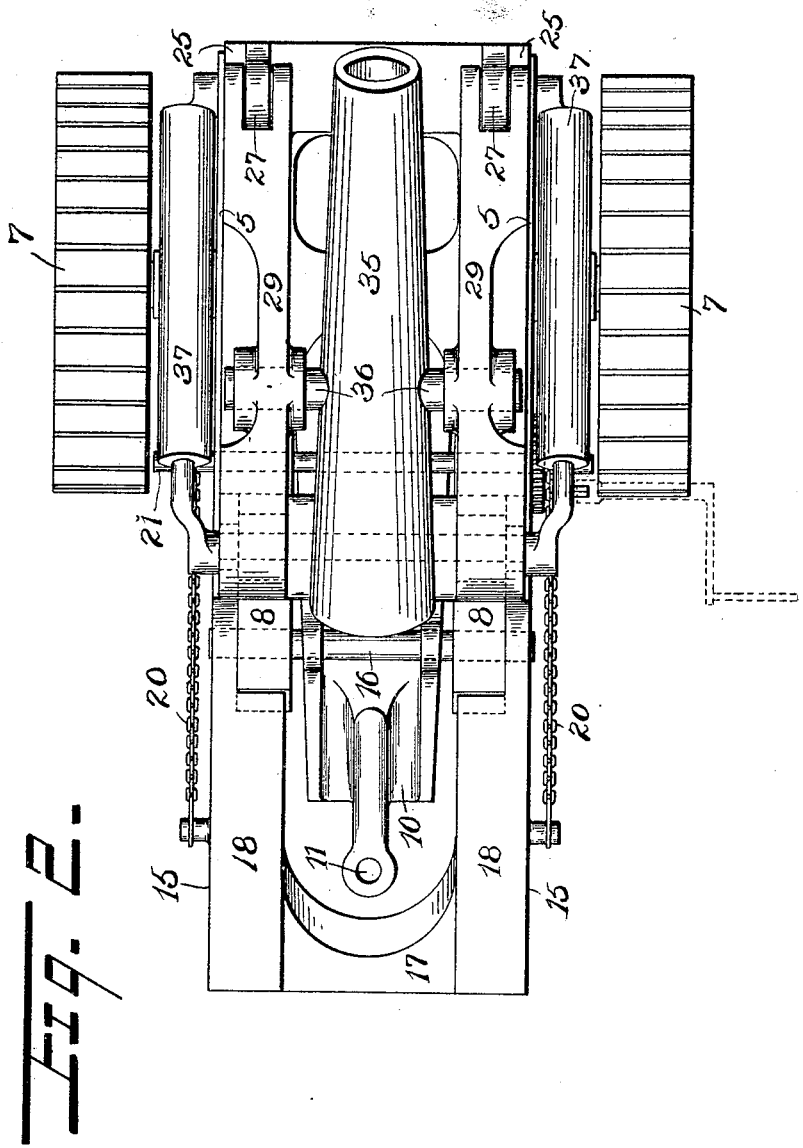

UNITED STATES PATENT OFFICE.

HENRY F. LOOMIS, OF READING, PENNSYLVANIA.

CARRIAGE FOR HEAVY FIELD-ARTILLERY.

1,220,246.   Specification of Letters Patent.   Patented Mar. 27, 1917.

Application filed September 12, 1916.   Serial No. 119,618.

*To all whom it may concern:*

Be it known that I, HENRY F. LOOMIS, a citizen of the United States, residing at Reading, in the county of Berks and State of Pennsylvania, have invented certain new and useful Improvements in Carriages for Heavy Field-Artillery, of which the following is a specification.

My invention relates to carriages for heavy field artillery, and my main object is to provide, in a single unit, a suitable mounting for guns of large bore that will provide an adequate support capable of withstanding the heavy shocks of firing, and at the same time may be readily attached without disassembling, to a motor vehicle for quick transportation. The invention is fully described in connection with the accompanying drawings showing an embodiment thereof, and the novel features are specifically pointed out in the subjoined claims.

Figure 1 is a side elevation, the near wheel being removed, of a gun carriage embodying my invention; the recoil position being indicated in heavy dotted lines, and the folded-up position of the recoil track being shown in light dotted lines.

Fig. 2 is a plan view of the same.

Heretofore guns of large caliber have required a prepared foundation, or have been made up in sections that are disassembled for transportation, which reduces their effective mobility. I have devised a carriage that will readily transport the gun and at the same time provide an adequate support for service.

In the drawings showing one embodiment of my invention, 5—5 represent parallel side members of a platform or stock, mounted on an axle 6, the wheels 7—7 of the latter being of broad tread as shown to permit travel over soft ground or rough roads. These side members 5—5 are provided with lowered rearward extensions 8—8 as shown and are spaced apart at their front and rear ends by cross members indicated in dotted lines. A trail piece 10 from the axle 6 embraces the rear cross member of the platform to form a rigid structure. A trail eye 11 on the trail piece 10 is provided to connect the carriage to a limber or motor truck for transporting the gun from place to place.

To the extensions 8—8 of the platform is secured a recoil-track device as shown the side members 15—15 of which are pivoted at 16 to said extensions, the pivot pin preferably being extended across the trail piece 10 and connected thereto to give increased strength and rigidity. These side members 15—15 are connected by a rear cross member 17 and their upper surfaces 18—18 are curved as shown to form upwardly inclined recoil track extensions of the platform extensions 8—8.

This recoil track device is adapted to be elevated or swung on its pivot 16 to raise the same above the ground during transportation, or lateral adjustment of the carriage, which swinging movement may be accomplished as shown, by chains 20—20 connecting said track device to a shaft 21, driven through a train of gears by a crank. Studs or hobs 22 are provided on the under surface of the track to bite into the ground to more firmly resist movement, and openings 23—24 registering with openings in the extensions 8—8 provide for pins to lock the track in either raised or lowered positions.

Upon the platform is mounted a frame member having parallel sides 25—25, rigidly connected by spacing bars and slidable on the platform members 5—5. Tongues 26 engaging in grooves in the members 5—5 are preferably provided to insure against any but longitudinal movement.

This frame is of equal length with the upper portion of the fixed platform and is provided at its forward end with pivot ears 27—27. To these pivot ears are secured by pins 28—28 the forward ends of cheek blocks 29—29, their rear ends having depending portions 30—30, resting on the platform extensions 8—8 and bearing against the ends of the sliding frame and the upper portion of the platform to limit the forward movement of the sliding frame. These cheek blocks are rigidly spaced by cross connections and are preferably provided with anti-friction rollers 31—31 mounted in their depending portions to roll upon the extensions 8—8 and the recoil tracks 18—18. The gun 35 is mounted by means of trunnions 36 engaged in bearings in the cheek blocks, and is provided with the usual elevating and sighting mechanism, not shown. Recoil cylinders 37—37 are indicated connecting the cheek blocks 29—29 to the side members 5—5 of the fixed platform to assist in absorbing the recoil shock of firing.

This construction provides in one unit a carriage for transporting and firing the gun; in transporting the recoil track being elevated by the chains 20—20 to the position shown in light dotted lines in Fig. 1, while the position for discharging the gun is indicated in full lines. Upon discharge of the gun the recoil shock carries the cheek blocks 29—29 and the sliding frame 25—25 rearward, as shown in heavy dotted lines in Fig. 1, the depending rollered ends 30—30 of the former riding rearward and upward on the recoil track extensions 18—18 of the platform extensions 8—8 while their forward ends turn on the pivot ears 27—27 of the horizontally moving sliding frame 25—25. This rearward movement of the cheek blocks and sliding frame lifts the gun vertically tending to check its rearward movement and absorb the recoil. The recoil cylinders 37—37 are shown as auxiliary shock absorbers.

My construction provides in a simple and economical way for absorbing the recoil shock by utilizing the weight of the gun itself riding up an incline, while the carriage is so designed that this recoil track incline may be elevated above the trail piece for ready attachment of the trail eye to a tractor unit for movement from place to place. No prepared foundations are required by my carriage and no disassembling for movement from one location to another. With my improved carriage guns of large caliber are available for ready transportation and immediate service whenever needed with almost the freedom of light field artillery.

What I claim is:

1. In heavy field artillery, a wheeled carriage comprising a platform and a trail-piece having a recoil-track extension, a frame member slidably mounted on said platform, and a cheek block member pivotally secured to the forward end of said sliding frame member and having its rear end resting on said recoil-track extension.

2. In heavy field artillery, a wheeled carriage comprising a platform and a trail-piece having a hinged recoil-track extension, a frame member slidably mounted on said platform, and a cheek block member pivotally secured to the forward end of said sliding frame member and having its rear end resting on said recoil-track extension.

3. In heavy field artillery, a wheeled carriage comprising a platform and a trail-piece having a hinged recoil-track extension, a frame member slidably mounted on said platform, a cheek block member pivotally secured to the forward end of said sliding frame member and having its rear end resting on said recoil-track extension, and means to elevate said hinged recoil-track extension.

4. In heavy field artillery, a wheeled carriage comprising a platform and a trail-piece having a hinged recoil-track extension, a frame member slidably mounted on said platform, a cheek-block member pivotally secured to the forward end of said sliding frame member and having its rear end resting on said recoil-track extension, and means to elevate said hinged recoil-track extension, and means to lock the latter in both raised and lowered positions.

5. In heavy field artillery, a wheeled carriage comprising a fixed platform and a trail-piece having an upwardly inclined recoil track extension, a frame member slidably mounted on said platform, and a cheek-block member pivotally secured to the forward end of said sliding-frame member and having its rear end resting on said recoil-track extension.

6. In heavy field artillery, a wheeled carriage comprising a fixed platform and a trail-piece having an upwardly inclined recoil track extension, a frame member slidably mounted on said platform, and a cheek-block member pivotally secured to the forward end of said sliding-frame member and having a depending rear portion overhanging said sliding-frame member and resting on said recoil-track extension.

7. In heavy field artillery, a wheeled carriage comprising a fixed platform and a trail-piece having an upwardly inclined recoil track extension, a frame member slidably mounted on said platform, and a cheek-block member pivotally secured to the forward end of said sliding-frame member and having a depending rear portion overhanging said sliding-frame member and resting on said recoil-track extension and auxiliary recoil cylinders connecting said fixed platform and cheek-block member.

In testimony whereof I affix my signature.

HENRY F. LOOMIS.

Copies of this patent may be obtained for five cents each, by addressing the "Commissioner of Patents, Washington, D. C."